United States Patent Office

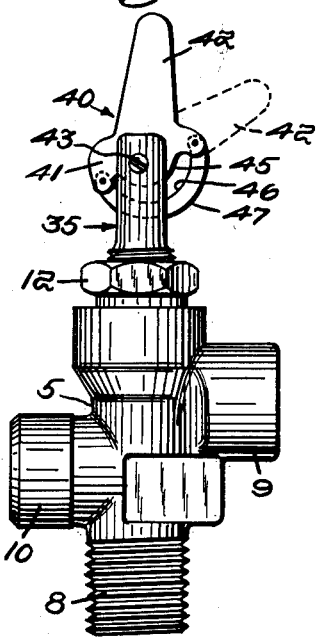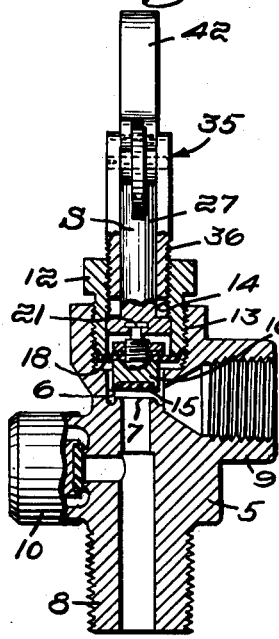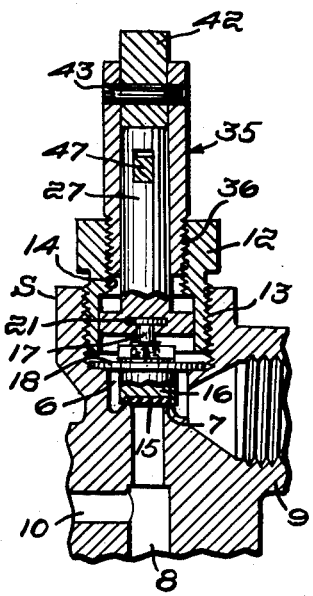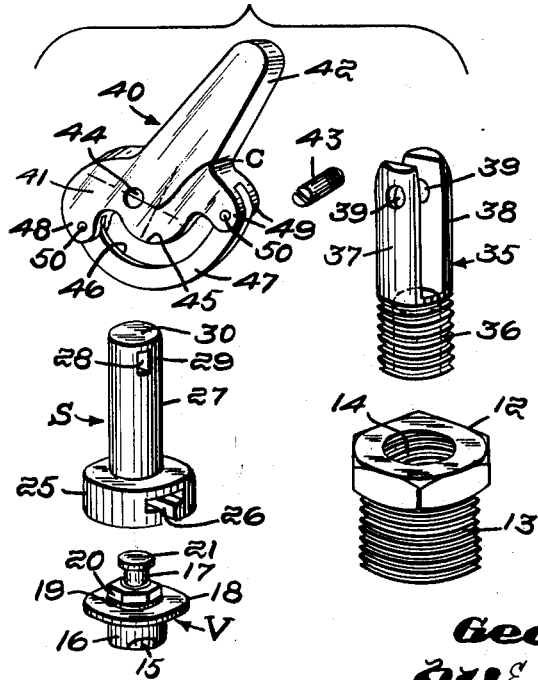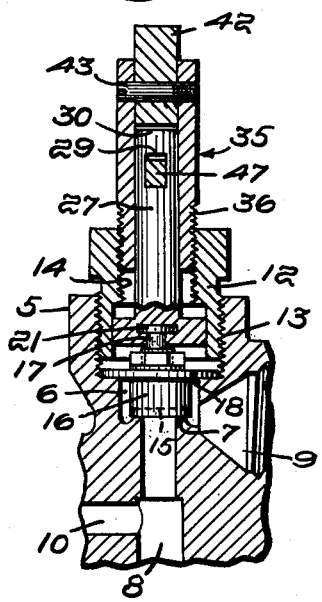

2,732,166
Patented Jan. 24, 1956

2,732,166
DUAL ACTION VALVE
George A. Rayner, Jr., Bangor, Maine

Application June 19, 1953, Serial No. 362,932

1 Claim. (Cl. 251—88)

My present invention relates to valves and particularly those of the push-pull type wherein the seating and unseating of the valve proper such as a valve disc is a non-rotary straight-line reciprocating movement, as typified in the class of diaphragm valves. While the principle and means of the invention are applicable to various uses of valves of the class described, the invention is especially suited for use in connection with the flow and shut off of fluids under pressure such as petroleum gas in the liquid as well as in the gaseous phase.

In the drawings illustrating by way of example one embodiment of the invention:

Fig. 1 is a side elevation of a complete valve unit with the operating lever or handle at "open," a closed position thereof being shown dotted;

Fig. 2 is a view corresponding to Fig. 1 but mainly in vertical section and with the handle and associated parts turned 90° clockwise from the Fig. 1 position;

Fig. 2a is an elevational view like the main portion of Fig. 2 on a somewhat larger scale but with the valve quick-closed solely by down swinging of the hand lever, as if to the dotted line position of Fig. 1, the valve proper or disc being shown in side elevation;

Fig. 3 is a similar sectional view on the scale of Fig. 2a but with the valve compressively closed under turning of the valve stem and carrier sleeve about the longitudinal axis of the latter; and Fig. 4 is an exploded perspective view of the valve bonnet, valve and associated operating parts.

Within the general class described the valve and valve-operating means of the invention may be adapted to various structures of push-pull shut-off valves, including globe and angle valves for use in pipe lines and particularly valves referred to in the trade as cylinder valves, that is, valves for installation on cylinders, tanks and other containers of gas under pressure such as the so-called "bottled" gas, butane, propane and other petroleum gases. For the purposes of illustration I have herein shown a gas cylinder valve as typical of the class concerned.

Referring to the drawings in more detail, the valve unit as there shown comprises a valve body 5 defining a valve chamber 6 having therein a valve seat 7.

The body further incorporates an inlet connection 8 and an outlet connection 9 both communicating with the valve chamber 6 at the opposite sides of the valve seat 7 and provided in this instance with external and internal threading respectively. The inlet connection 8 is adapted for installation at the usual port of the gas cylinder, tank or container. The outlet connection 9 which may also be used for filling the cylinder is dimensioned and arranged for attachment of the appropriate pipe, hose or conduit fittings. In the selected example the valve body also incorporates a safety relief outlet 10 preferably of the well-known "pop" action type.

The portion of the valve body opposite the valve seat 7 is constructed and arranged for removable installation of a valve bonnet 12. In the chosen example the bonnet 12 is of the sleeve or plug form and is externally threaded as at 13 for reception by a corresponding internal threading on the wall of the enlarged outer portion of the valve chamber 6. Any of the known or preferred bonnet constructions may be employed including the internally threaded cup type, the annular flanged bolt-on type and other forms. Thus the parts referred to this point may be of standard or any preferred construction selected as appropriate to the particular use.

Heretofore so far as I am aware valves of the class here concerned have employed a solely rotary valve stem, rotatively manipulated by a wheel or T handle or by application of a wrench. To shift the valve between full closed and full open has required a number of complete turns of the wrench or handle. In the liquified petroleum gas industry the men at the cylinder filling locations and those in the field expend much time and effort in the relatively slow and lengthy rotary manipulation of the shut-off valves, both in the lines and for the cylinders. My invention has as a main object the relieving of such laborious procedure through the provision of novel means whereby the valve has a main straight-line or plunger motion of quick action to and from closure yet at the same time is afforded capacity for a final tight-seal effecting rotation of the manipulator or handle, with a reverse seal-breaking initial action in the opening direction.

It will be convenient here, before describing the dual-action quick-closing means, to identify the valve proper and to make clear that it has swiveled connection with the dual-action sliding and rotating valve stem and manipulating means to be described.

As seen in section in Figs. 2 and 3, in elevation in Fig. 2a and separately at the lower left in Fig. 4, the valve proper which is designated generally at V comprises a sealing disc 15 held in a retaining collar 16 threaded onto the lower end of a valve stud 17. The valve disc 15 is of a fibre or other composition relatively soft as compared with metal and of adequate resiliency to absorb small particles of foreign matter that may lodge between it and the valve seat 7.

Valves of this general class, particularly for handling gas under substantial pressure, desirably are provided with a secondary seal by means of a diaphragm, from which they are sometimes referred to in the trade as diaphragm valves. In the present example such diaphragm 18 is received about the valve stud 17 above the disc retainer 16 where it is held by a slip washer 19 and nut 20. The diaphragm 18 seats on a concentric shoulder spaced axially from the valve seat 7 and defining the bottom of the enlarged portion of the valve chamber 6 in which the valve bonnet 12 is herein received, outwardly of the diaphragm 18.

The valve proper V including the primary sealing disc 15 and the secondary sealing and supporting diaphragm 18, further comprises an annularly flanged head 21 at the upper end of the stud 17 by means of which the valve V is swivelly connected to the reciprocating valve stem indicated generally at S. In this manner the valve stem S to be described is enabled at times to rotate about its axis, without requiring rotation of the valve V.

The valve stem S comprises a foot 25 at the inner end, of circular cross-section for sliding guided fit as well as capacity for turning within the non-threaded cylindrical inner wall of the inner portion of the valve bonnet 12. The stem foot 25 has an undercut radial slot as at 26, see Fig. 4, to receive the head 21 of the valve V, thereby affording a swivel interconnection for the valve and valve stem, whereby the two move together in the axial direction, to and from seating of the valve disc 15 but permitting free relative turning about the stem axis. That is, the valve V can remain at rest, non-rotatively, on the seat 7 while the stem S is turned with the sleeve carrier 35 to be described thereby to compressively seal the disc 15 at the valve seat.

The valve stem S further comprises the stem proper 27 of a length to project beyond the bonnet 12. This stem 27 is non-threaded and is slidably guided in the carrier 35 mentioned. While shown as round in section it may be otherwise formed for longitudinal reciprocating guided movement within and in and out relative to the carrier sleeve 35, toward and from the seat 7. At the outer portion the stem 27 is formed with follower cam surfaces for positive inward thrusting and opposite outward withdrawal or lifting of the stem and valve pair S and V. In the example shown this is accomplished by providing an aperture 28 diametrically through the upper portion of the stem 27 and utilizing the solid cross wall to present the cam-engaging means. The inner face 29 of said cross wall, within the aperture 28, is adapted for engagement by the lifter cam of the manipulator to be described, preferably being somewhat rounded in the manner of a nose or wiper cam. The outer face 30 of said cross wall presents a cam or follower surface for coaction with the depresser or in-thrusting cam of said manipulator.

The carrier element already mentioned is designated generally at 35. It constitutes means for mounting and slidably guiding the valve stem S in its quick-action reciprocating motion of closure and opening of the valve. In addition the carrier 35 being screw threaded into the valve bonnet 12 is itself bodily rotatable about its axis and as a unit with the valve stem S so as to force the valve V into sealed engagement on the valve seat 7. As best seen separately in Fig. 4 this carrier 35 comprises at the inner end an externally threaded sleeve 36 rotatably received by a similar internal threading 14 on the inner wall of the valve bonnet 12. The outer portion of the carrier 35, which may conveniently be integrally formed from cylindrical metal stock, is forked to present parallel spaced legs 37, 38. The sleeve portion 36 has an axial bore of cross-sectional form and dimension for slidably receiving and guiding the stem 27 of the valve stem element S.

The carrier 35 further serves as the supporting mount for the manipulator or cam actuator and handle element designated generally at 40, also seen separately in the exploded view Fig. 4. This element 40 comprises a transverse body or cross-piece 41 having an integrally projecting arm 42 constituting an operating lever or handle. It is pivotally mounted on and between the carrier legs 37, 38 for swinging about an axis at right angles to that of the carrier and valve stem. For this purpose the carrier legs 37, 38 have near their outer ends aligned apertures 39 to receive a bearing stud 43 defining the pivotal axis. Said pivot stud 43 is shown in the form of a screw of which the threaded end enters one of the apertures 39 tapped for the purpose. The body 41 of the manipulator 40 has a bearing aperture 44 through which the stud 43 passes; see also Figs. 2a and 3. Thus the actuator or handle element 40 is adapted to be swung about the pivot axis at 43 between a valve-opening position as shown in full lines in Figs. 1 and 2 and a quick-action valve-closing position as indicated by the dotted showing of Fig. 1 and seen also in Figs. 2a and 3.

The handle or manipulator 40 is operatively related to the valve stem S by eccentric cam means adapted for coaction with the follower cam surfaces 29, 30 thereon already described. In effect the body portion 41 of the manipulator 40 is provided with an arcuate cam slot of which the opposed cam walls are formed about a common center predeterminedly offset from the pivot axis 43 of the manipulator. As herein shown, again noting particularly Fig. 4, one such eccentric arcuate cam surface is integrally formed on the body 41 of the manipulator 40 as at 45. It is struck about a center $c$ radially offset, to the right in Fig. 4, from the manipulator pivot 43. For ease of manufacture the other eccentric cam surface 46 is formed on a bowed strap 47 of a cross-sectional shape and dimension to pass freely through the aperture 28 at the outer end of the valve stem 27. The respective ends of this arcuate cam-carrying strap 47 are inserted between pairs of ears 48, 49 on the actuator body 41 where they are anchored as by pins 50. The curvature and degree of eccentricity for the cam surfaces 45, 46 of the manipulator with respect to the pivot axis 43 of the latter are calculated with respect to the maximum lift desired for the valve V.

From a consideration of Fig. 4 in comparison with the other views, it will be apparent that the manipulator cam 45 nearer to the pivot axis at 43 coacts with the depresser cam formation 30 at the outer end of the valve stem 27 to effect the non-rotary plunger-like quick-closing of the valve V. Thus, from the lifted or open position of the valve in Fig. 2, quick closure is effected merely by swinging the handle 42 of the manipulator 40 from the elevated position of Figs. 1 and 2 to the down or in position of Fig. 2a, indicated also by the dotted showing in Fig. 1. Thereby the valve stem S is moved inward along the carrier 35, that is, downward in the views, without rotation of the stem S about its axis. The valve disc 15 is thus slidably shifted with a plunger-like action into or substantially into contact with the valve seat 7. This assumes of course that in the starting open or erect position of the handle 42 the rotative adjustment of the carrier 35 in and with respect to the valve bonnet 12 is such that the opened valve disc 15 stands within the maximum lift range of the cam means. To insure a full compressive sealing closure of the valve disc 15 onto the seat 7 the carrier 35 together with the valve stem S as a unit is bodily rotated about the common axis of the pair, through the medium of the lever-handle 42 then used as a torque-applying member. During such compressive sealing closure of the valve V the latter remains stationary on the valve seat, without rotation relative thereto, by reason of the described swivel connection between the valve V and valve stem S.

The compressive sealing action, accomplished by rotation of the valve stem S and carrier 35 as a unit, will be apparent from a comparison of Fig. 2a with Fig. 3. Fig. 2a represents the quick inward thrusting of the valve disc 15 into or nearly into engagement with the seat 7, the carrier 35 not yet having been turned down, as apparent from the projection of the outer portion of the carrier threading beyond the valve bonnet 12. By comparison, in Fig. 3, the valve disc 15 has been forced firmly and compressively into sealing engagement upon the seat 7, the carrier 35 having been further screwed down into the valve bonnet 12. For the purposes of explanation the extent of in-turning of the carrier 35 with respect to the valve bonnet 12 is exaggerated as between Figs. 2a and 3. Generally, with the carrier 35 set at or but little beyond the cam throw range, it will be adequate to accord but a relatively slight axial rotation to the carrier 35, less than a full turn and usually but on the order of a quarter turn or less to effect the fully sealed seating.

Complete opening of the valve, from the fully compressively sealed status of Fig. 3 to the open position of Figs. 1 and 2 may be effected merely by pivotal upthrow of the handle 42. Following such cam-effected opening, with no rotation of the carrier 35, immediate full-seal compressive closure may be had merely by reverse throw-down of the handle, with no necessary turning of the carrier. Obviously also it is possible to open the valve V from the Fig. 3 position wholly by reverse or back-off rotation of the sleeve 35 relative to the valve bonnet 12. The same applies also to valve closure. Thus a dual-action valve is provided having capacity for quick and convenient operation yet with positive assurance of complete sealing against any opposing pressure encountered from the liquid or gaseous fluid being handled, within the maximum pressure range for the given valve. It will likewise be evident that the described valve actuating cam formations act positively in both directions wholly without the use of spring means, and further that they are non-reversible or self-locking in the presence of the opposing pressure of the fluid being controlled.

My invention is not limited to the particular embodiment thereof illustrated and described herein, and I set forth its scope in my following claim:

I claim:

A dual-actuatable pressure-fluids shut-off valve comprising a body defining a valve chamber containing a valve seat, a bonnet for the chamber, inlet and outlet connections communicating with the chamber at opposite sides of the valve seat, a valve member bodily rectilineally movable to and from the valve seat, a non-threaded valve stem extending through the bonnet and having the inner end swivel-connected to the valve member, a carrier having a sleeve portion internally slidably receiving the valve stem for straight lineal reciprocating actuation, said carrier sleeve portion externally threadedly engaged in the bonnet so as at all times to be free for bodily axially rotative actuation of the carrier and valve stem as a unit in and relative to the bonnet, a flexible diaphragm on and in sealing engagement with the valve member and with the surrounding wall of the bonnet at a level spaced from the valve seat so as to partition and supplementally seal the valve seat portion of the chamber from the valve-actuating parts while providing for seating and unseating actuation of the valve in the direction of the stem axis, said carrier including a support portion projecting from the bonnet, a handled lever element pivotally mounted on said carrier support portion on an axis normal to the valve stem axis, and a positive quick-action two-way push-pull cam device on and operatively connecting said lever element and the valve stem including outer and inner arcuate cam formations on the lever element eccentric to the pivot axis thereof and respectively coacting outer and inner follower formations on the valve stem, said lever element, cam device and carrier constituting a common manual operating means operative upon the valve independently of fluid flow and pressure in either direction relative to the valve and whereby pivoting of the lever element on the carrier in one and the opposite direction positively pushes and pulls the valve stem and valve to and from the valve seat with a rapid action and whereby turning of the lever element about the valve-stem axis at any time at the will of the operator produces freely available bodily axial turning of the carrier and valve stem as a unit in and relative to the bonnet and thereby effects similar but slower and screw-powered closing and opening of the valve.

References Cited in the file of this patent

UNITED STATES PATENTS

| | | |
|---|---|---|
| 27,801 | Higginbothom | Apr. 10, 1860 |
| 678,994 | Burroughs | July 23, 1901 |
| 865,568 | Cooper | Sept. 10, 1907 |
| 1,055,152 | Erickson | Mar. 4, 1913 |
| 1,655,241 | Rice | Jan. 3, 1928 |
| 1,762,306 | Mueller | June 10, 1930 |
| 1,898,519 | Aull | Feb. 21, 1933 |
| 2,066,112 | Humblet | Dec. 29, 1936 |
| 2,090,309 | Ripley | Aug. 17, 1937 |
| 2,118,300 | Ford | May 24, 1938 |
| 2,618,458 | Fosbender | Nov. 18, 1952 |

FOREIGN PATENTS

| | | |
|---|---|---|
| 160,265 | Great Britain | of 1921 |